US008648307B2

(12) United States Patent
Nishikawa et al.

(10) Patent No.: US 8,648,307 B2
(45) Date of Patent: Feb. 11, 2014

(54) INFRARED RAY DETECTOR

(75) Inventors: Takayuki Nishikawa, Osaka (JP);
Tomohiro Kamitsu, Kobe (JP);
Yoshiaki Honda, Souraku-gun (JP)

(73) Assignee: Panasonic Corporation, Kadoma-shi (JP)

( * ) Notice: Subject to any disclaimer, the term of this patent is extended or adjusted under 35 U.S.C. 154(b) by 756 days.

(21) Appl. No.: 12/602,758

(22) PCT Filed: Jun. 5, 2008

(86) PCT No.: PCT/JP2008/060357
§ 371 (c)(1),
(2), (4) Date: Dec. 2, 2009

(87) PCT Pub. No.: WO2008/149926
PCT Pub. Date: Dec. 11, 2008

(65) Prior Publication Data
US 2010/0176300 A1 Jul. 15, 2010

(30) Foreign Application Priority Data

Jun. 8, 2007 (JP) .................................. 2007-153010
Nov. 26, 2007 (JP) .................................. 2007-304477

(51) Int. Cl.
*G01J 5/02* (2006.01)
*G02B 13/14* (2006.01)
(52) U.S. Cl.
USPC ........ 250/342; 250/349; 250/353; 250/338.1; 359/356; 359/625
(58) Field of Classification Search
USPC ............ 250/349, 353, 338.1, 338.4; 359/837, 359/355–356
See application file for complete search history.

(56) References Cited

U.S. PATENT DOCUMENTS 3,136,895 A * 6/1964 Whitney ...................... 250/236
4,234,906 A * 11/1980 Schindler ...................... 362/16
(Continued)

FOREIGN PATENT DOCUMENTS

EP 1498749 A2 6/2004
JP H58-191584 H 12/1983
(Continued)

OTHER PUBLICATIONS

JP-H10-214546-A, Norisada et al. (Omron Co.), English language translation provided by Applicant in IDS dated Dec. 2, 2009.*

(Continued)

*Primary Examiner* — David Porta
*Assistant Examiner* — Jeremy S Valentiner
(74) *Attorney, Agent, or Firm* — Marvin A. Motsenbocker; Mots Law, PLLC

(57) ABSTRACT

An infrared ray detector comprises a prism element, a condenser lens, and an infrared ray receiving unit. The prism element is configured to convert the infrared ray irradiated from a detection area of a viewing field to the infrared ray proceeding toward the condenser lens. The condenser lens is configured to concentrate the infrared ray into the infrared ray receiving unit. The infrared ray receiving unit includes a plurality of the infrared ray detection elements. The infrared ray detection elements are arranged in an alternate fashion so as to output electrical signals of positive polarity and negative polarity. Consequently, the infrared ray detector is configured to detect the infrared ray irradiated from a plurality of the detection area, and is configured to detect the infrared ray on the basis of movement of the human in the detection area.

19 Claims, 10 Drawing Sheets

(56) References Cited

U.S. PATENT DOCUMENTS

| | | | | |
|---|---|---|---|---|
| 4,442,359 A | * | 4/1984 | Lederer | 250/342 |
| 4,576,850 A | * | 3/1986 | Martens | 428/156 |
| 4,734,585 A | * | 3/1988 | Owers | 250/353 |
| 4,772,797 A | * | 9/1988 | Kahl et al. | 250/353 |
| 4,900,914 A | * | 2/1990 | Raff et al. | 250/216 |
| 5,124,546 A | * | 6/1992 | Hu | 250/216 |
| 5,308,985 A | * | 5/1994 | Lee | 250/353 |
| 5,461,231 A | * | 10/1995 | Sugimoto et al. | 250/342 |
| 5,550,373 A | * | 8/1996 | Cole et al. | 250/338.1 |
| 5,905,571 A | * | 5/1999 | Butler et al. | 356/328 |
| 5,929,445 A | | 7/1999 | Barone | |
| 6,653,939 B2 | * | 11/2003 | Galloway | 340/545.3 |
| 7,113,341 B2 | * | 9/2006 | Kamijima | 359/619 |
| 7,276,702 B2 | | 10/2007 | Yamaguchi et al. | |
| 7,768,686 B2 | * | 8/2010 | Stenton | 359/211.3 |
| 2005/0043630 A1 | * | 2/2005 | Buchert | 600/473 |
| 2005/0199785 A1 | | 9/2005 | Yamaguchi et al. | |

FOREIGN PATENT DOCUMENTS

| | | | | |
|---|---|---|---|---|
| JP | 4-4290 U | | 1/1992 | |
| JP | 4-63401 U | | 5/1992 | |
| JP | 4-87491 U | | 7/1992 | |
| JP | 7-29492 U | | 6/1995 | |
| JP | 08-101346 A | | 4/1996 | |
| JP | 8-313339 A | | 11/1996 | |
| JP | 10-073483 A | | 3/1998 | |
| JP | 10-214546 A | | 8/1998 | |
| JP | 10-243481 A | | 9/1998 | |
| JP | H10-214546 | * | 11/1998 | H01H 35/00 |
| JP | 11-248540 A | | 9/1999 | |
| JP | 2001-352470 A | | 12/2001 | |
| JP | 2007-86767 A | | 4/2007 | |
| WO | WO-98/11521 A1 | | 3/1998 | |
| WO | 2006/055094 A1 | | 5/2006 | |
| WO | 2007/019136 A2 | | 2/2007 | |

OTHER PUBLICATIONS

Notification of Reasons for Refusal for the Application No. 2007-153010 from Japan Patent Office mailed Oct. 23, 2012.

International Search Report for the Application No. PCT/JP2008/060357 mailed Sep. 2, 2008.

* cited by examiner (a)

(b)

INFRARED RAY DETECTOR

TECHNICAL FIELD

This invention relates to an infrared ray detector.

BACKGROUND ART

Japanese patent application publication No. 11-248540A discloses a conventional infrared ray detector. The conventional infrared ray detector comprises a housing, an infrared ray detection element, and a condenser lens. The housing houses the infrared ray detection element. The housing is formed with an opening such that the condenser lens is attached to the housing to be located in the opening. The infrared ray detection element is arranged to receive infrared ray. The infrared ray detection element is configured to output the electrical signal according to an amount of the infrared ray incident on the infrared ray detection element. The condenser lens is disposed to concentrate the infrared ray incident on the condenser lens from a predetermined detection area into the infrared ray detection element. The infrared ray is incorporated into lighting devices, automatic doors, and security devices in order to detect the infrared ray radiated from the human. The infrared ray detector is configured to generate the signal on the basis of the detected infrared ray, and subsequently send the signal to the control unit. The control unit receives the signal, and is configured to control the lighting devices, the automatic doors and the security devices on the basis of the signal. In a case where the infrared ray detector is employed in order to control the devices such as the lighting devices, the infrared ray detector is configured to monitor a plurality of detection areas. Consequently, the infrared ray detector is configured to detect the human being located in the detection areas.

The infrared ray detector requires sets of the infrared ray detection element and the condenser lens per detection area in order to detect existence or nonexistence of the human in a plurality of the detection areas. Consequently, the infrared ray detector is configured to have the number of the detection areas which is equal to the number of the condenser lenses. In the infrared ray detector, the infrared ray radiated from the human in the detection area corresponding to the condenser lens is concentrated into the infrared ray detection element. The infrared ray detection element detects the concentrated infrared ray. In this manner, the infrared ray detector detects the infrared ray. However, the infrared ray detector of this type requires a plurality of the condenser lenses. That is, the infrared ray detector of this type requires a lot of components. Therefore, there is a problem that cost of the infrared ray detector is increased.

Moreover, Japanese patent application publication No. 10-214546A discloses another conventional infrared ray detector having a diffraction grating. In this infrared ray detector, the infrared ray from the detection area is passed through the diffraction grating to the infrared ray receiving unit. However, the diffraction grating has a narrow viewing field for detection area. Therefore, there is a low flexibility of designing the detection area.

DISCLOSURE OF THE INVENTION

This invention is achieved to solve the above problem. An object in this invention is to provide an infrared ray detector having a lot of flexibility of designing the detection area.

To solve the above problem, the invention discloses an infrared ray detector which comprises a prism element, a housing, a condenser lens, and an infrared ray receiver. The prism element is provided for passing infrared ray incident on the prism element. The housing is formed with an opening for introducing the infrared ray passed through the prism element. The condenser lens is configured to condense the infrared ray introduced into the housing through the opening. The infrared ray receiver is configured to receive the infrared ray condensed by the condenser lens. The infrared ray receiver is configured to output signal according to the infrared ray which is received by the infrared ray receiver. The feature of the invention resides in that the prism element includes a plurality of V-shaped grooves and exit faces. Each exit faces are formed between the V-shaped grooves. Each of the V-shaped grooves includes refractive face, respectively. The refractive face is shaped to convert the infrared ray incident on the refractive face at a predetermined inclined angle with respect to the optical axis to the infrared ray proceeding along the optical axis. The exit face is shaped to take in the infrared ray coming along the optical axis, and leave the same ray to exit out of the prism element along the optical axis. The infrared ray receiver includes a first infrared ray detection element and a second infrared ray detection element. The first infrared ray detection element is configured to output the signal according to the infrared ray which is received by the first infrared ray detection element. The second infrared ray detection element is configured to output the signal according to the infrared ray which is received by the second infrared ray detection element. The signal which is output from the second infrared ray detection element has electrical polarity which is opposite to electrical polarity of the signal which is output from the first infrared ray detection element. The first infrared ray detection element and the second infrared ray detection element are arranged along a direction perpendicular to the optical axis.

In this case, the infrared ray detector having the prism element including the refractive face and the exit surface is configured to detect the infrared ray radiated from the human in a plurality of the detection areas. Furthermore, because the infrared ray detector with this configuration is configured to detect the infrared ray coming from a plurality of the detection areas, it is possible to decrease the manufacturing cost of the infrared ray detector. Moreover, the infrared ray detector is configured to output the signals having a different electrical polarity according to movement of the human in each of the detection areas. Therefore, the infrared ray detector is configured to detect the existence of the human on the basis of the movement of the human in the detection area.

It is preferred that the infrared ray detector further comprises a cover. The cover is made of a material of thermal conductivity which is lower than thermal conductivity of the housing. The cover is installed to the housing so as to cover the housing. The prism element is formed so as to be formed with the cover integrally.

In this case, the cover prevents temperature of circumambient air of the infrared ray detector from influencing components within the infrared ray detector. Therefore, the infrared ray receiver disposed at an inside of the infrared ray detector is uninfluenced by the temperature of the circumambient air.

It is preferred that the housing is disposed within a casing. The casing has an aperture for introducing the infrared ray to the prism element. The infrared ray detector further comprises a retainer sheet which is configured to hold a plurality of said prism elements. Each of the prism elements has a viewing field which is different from viewing fields of the other prism elements. The retainer sheet is movably installed with the casing such that any one of the prism element is selectively overlapped with the aperture.

In this case, the infrared ray detector with this configuration has a plurality of the viewing fields due to the retainer sheet which holds a plurality of the prism elements. Moreover, any one of the prism elements is configured to be moved so as to be overlapped with the aperture. Therefore, this configuration makes it possible to provide the infrared ray detector which has the viewing fields corresponding to environments that the infrared ray detector is installed.

It is preferred that the retainer sheet is formed to have a rectangular shape. A plurality of the prism elements are arranged along the lengthwise direction of the retainer sheet such that the prism elements are arranged in a row. The casing is formed with a guide rail. The guide rail is configured to slidably receive a width end of said retainer sheet.

In this case, the casing holds the retainer sheet which is slidably held by the guide rail. Therefore, it is easy to select any one of the prism elements. Moreover, it is possible to prevent increase of the number of the components of the infrared ray detector.

It is preferred that each of the prism elements has the V-shaped grooves all of which extends along a same direction. In this case, the infrared ray detector is configured to have the viewing fields. Each of the viewing fields is different from the other viewing field. Each of the viewing fields is directed toward a same aspect.

It is also preferred that at least one of the prism element has the V-shaped groove which extends along a direction which is perpendicular to a direction of the V-shaped grooves of the other prism elements. In this case, the infrared ray detector has a plurality of the viewing fields. Each viewing field respectively covers the different detection area which lies along a direction different from that of the other different detection area.

It is also preferred that the retainer sheet further holds a neutral density filter. The neutral density filter is configured to decrease an amount of the infrared ray passing through the neutral density filter. The neutral density filter and the prism elements are arranged along the lengthwise direction of the retainer sheet such that the neutral density filter and the prism elements are arranged in a row. The infrared ray detector with this configuration has the viewing field which is close to the infrared ray detector. Therefore, the infrared ray detector with this configuration is able to use as a switch.

It is also preferred that the retainer sheet further holds a corrective lens. The corrective lens converts the infrared ray incident on the corrective lens at a predetermined inclined angle with respect to the optical axis to the infrared ray proceeding along the optical axis. The corrective lens and the prism elements are arranged in a row along the lengthwise direction. In this case, the infrared ray detector with this configuration is configured to detect the existence and nonexistence of the human located in a narrow and distant detection area.

It is preferred that the prism element is made of polyethylene. In this case, the prism element is manufactured easily.

BEST MODE FOR CARRYING OUT THE INVENTION

First Embodiment

Figure 2:
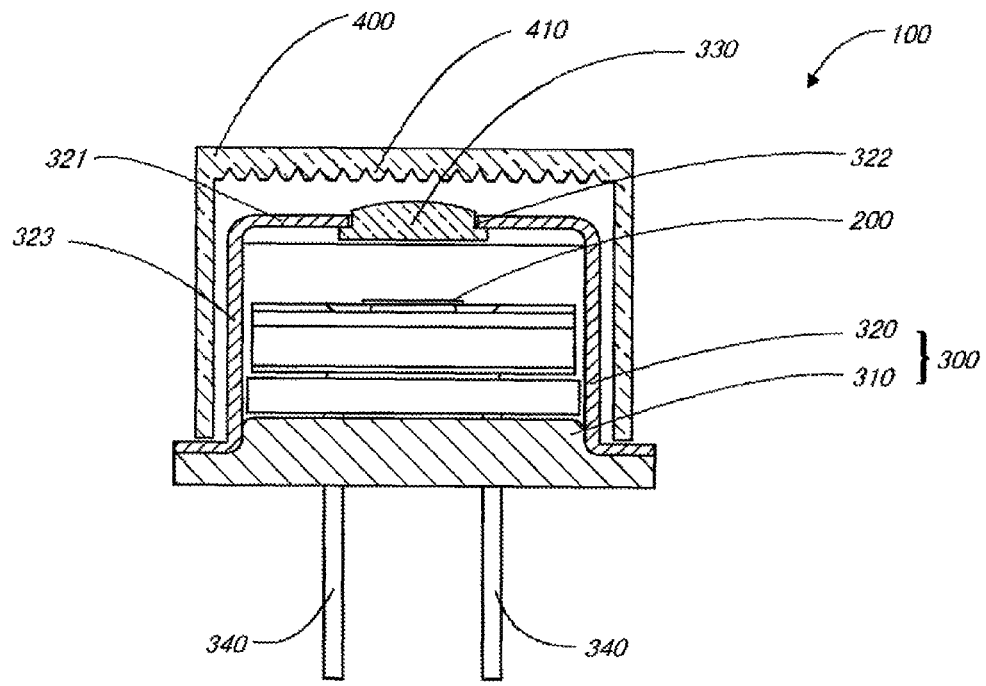
FIG. 2 is a side sectional view of the infrared ray detector of a first embodiment in this invention.
Figure 3:
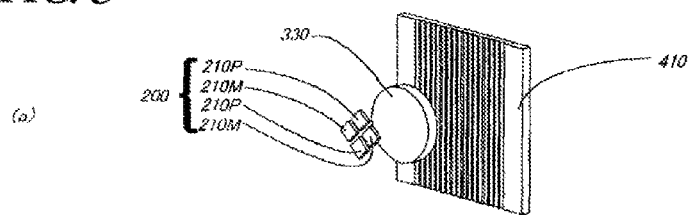
FIG. 3(a) is a perspective view of the infrared ray receiving unit.
FIG. 3(b) is a schematic view showing the arrangement of the infrared ray detection elements of the infrared ray receiving unit.
Figure 3:
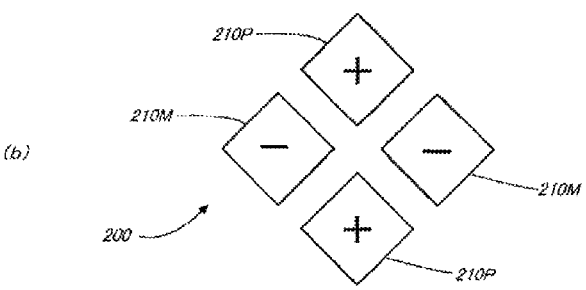

An infrared ray detector in this invention is explained with the attached drawings. FIG. 2 shows a side cross sectional view of the infrared ray detector 100 in the first embodiment. The infrared ray detector 100 comprises an infrared ray receiving unit 200, a housing 300, a condenser lens 330, and an outer cover 400. The housing 300 is formed with an opening 322. The outer cover 400 is integrally formed with a prism element 410.

The housing 300 is composed of a base 310 and an inner cover 320. The base 310 is formed to have a flat shape. The inner cover 320 is composed of a cylindrical side wall 323 and a top plate 321. The cylindrical side wall 323 is defined as a circumferential surface of the housing 300. The top plate 321 is defined as a top plane of the housing 300. The top plate 321 is located to be faced with the base 310. The base 310 is made of electrical conductive material such as metal. The base 310 holds terminals 340 which penetrate through the base 310. The terminals 340 are provided for sending the electrical signal generated by the infrared ray receiving unit 200 to an outside. The top plate 321 of the inner cover 320 is formed with an opening 322. The condenser lens 330 is attached to the housing so as to be located within the opening 322. The condenser lens 330 is a convex lens having one convex surface and one flat surface which is opposite from the convex surface. The condenser lens 330 is fitted into the opening 322 so as to have the convex surface which is directed toward the outside of the housing 300. Moreover, the housing further houses a processing circuit which is not shown. The processing circuit is configured to amplify signal which is output from the infrared ray receiving unit 200, and is configured to remove noises from the signal which is output from the infrared ray receiving unit 200. The housing 300 which houses the infrared ray receiving unit 200 is mounted on the circuit board, not shown, via the terminals 340.

The inner cover 320 of the housing 300 supports the cover 400 with the prism element 410. Consequently, the outer cover 400 is installed to the housing 300 so as to cover the housing 300. The outer cover 400 is made of polyethylene. The prism element 410 is formed with the outer cover 400 integrally. The outer cover 400 is attached to the housing 300 such that the outer cover 400 covers the side wall 323 and the top plate 321 of the housing 300. The outer cover 400 is adhered to the housing 300 via the adhesive. The outer cover 400 acts as the heat insulator. Therefore, the temperature of the infrared ray receiving unit 200 is uninfluenced by the temperature of the outside of the outer cover 400. It is noted that requirement of the outer cover 400 with the prism element 410 is that the outer cover 400 is made of light transmissive material. Therefore, the outer cover with the prism element 410 is capable of being made of such as silicon and germanium. Furthermore, the outer cover 400 with the prism element 410 is required to have high productivity and high thermal insulation property. Therefore, it is preferred that the outer cover 400 is made of synthetic resin. Especially, it is preferred that the outer cover 400 is made of polyethylene which has high light transmission property.

Figure 1:
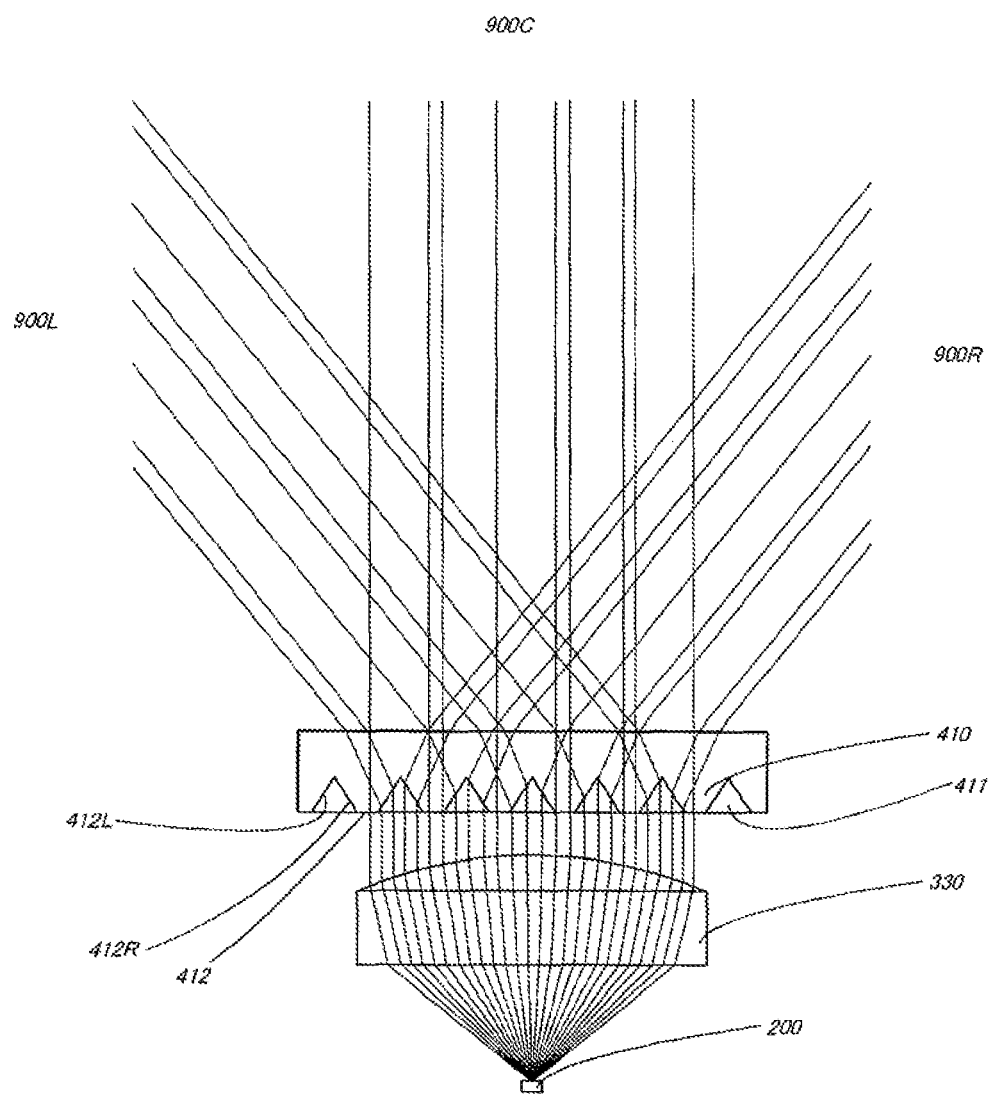
FIG. 1 shows a schematic view explaining positional relationship of the prism element, the condenser lens, and the infrared ray receiving unit of the infrared ray detector in this invention.

FIG. 1 shows a schematic view showing the positional relationship of the prism element 410, the condenser lens 330, and the infrared ray receiving, unit 200. The prism element 410 is disposed to have its plane which is perpendicular to an optical axis of the condenser lens 330. The prism element 410 has an outer surface and an inner surface 320. The outer surface is formed into flat. The inner surface 320 is faced to the inner cover 320. The inner surface 320 comprises a plurality of V-shaped grooves 411 and a plurality of exit faces 412. Each of the exit faces 412 is formed between the V-shaped grooves 411. Each of the V-shaped grooves 411 extends parallel to a lengthwise direction of the exit face 412. Each of the V-shaped grooves 411 is composed of a first refractive face 412L and a second refractive face 412R. The first refractive face 412L is shaped to convert the infrared ray incident on the refractive face 412L from the detection area 900L to the infrared ray proceeding along the optical axis of the condenser lens 330. That is, the first refractive face 412L converts the infrared ray incident on the first refractive face 412L at a predetermined inclined angle with respect to the optical axis of the condenser lens 330 to the infrared ray proceeding along the optical axis. The second refractive face 412R convert the infrared ray incident on the second refractive face 412R from the detection area 900R to the infrared ray proceeding along the optical axis of the condenser lens 330. That is, the second refractive face 412R is shaped to convert the infrared ray incident on the second refractive face 412R at a predetermined inclined angle with respect to the optical axis to the infrared ray proceeding along the optical axis. The exit face 412 is shaped to take in the infrared ray coming from the detection area 900C and leave the same infrared ray to exit out of the prism element along the optical axis of the condenser lens 330. That is, the exit face 412 is shaped to take in the infrared ray coming along the optical axis of the condenser lens 330 and leave the same ray to exit out of the prism element along the optical axis. Therefore, the prism element 410 is configured to convert the infrared ray incident on the first refractive face 412L, the second refractive face 412R, and the exit face 412 from the detection area 900L, 900R, and 900C respectively to the infrared ray proceeding along the optical axis of the condenser lens 330.

The first refractive face 412L, the second refractive face 412R, and the exit face 412 are arranged in order. Consequently, a thin size prism element 410 is obtained. Further, because the prism element 410 has a thin size, a size of the infrared ray detector is diminished. In addition, it is possible to reduce attenuation of the infrared ray in the prism element 410. In this case, it is preferred that the first refractive faces 412L, the second refractive faces 412R, and the exit faces 412 have a width corresponding to several times of the wavelength of the infrared ray, about 10 micrometer. Consequently, it is possible to prevent the prism element 410 from applying a potent influence to the infrared ray.

The prism element 410 makes it possible to manufacture the infrared ray detector at low cost than the cost of the infrared ray detector with the condenser lenses for detection of the infrared ray from the detection areas corresponding to the condenser lenses. Furthermore, it is possible to vary the detection area detected by the first refractive face 412L arbitrary by varying the first refractive face 412L, and also to vary the detection area detected by the second refractive face 412R arbitrary by varying the second refractive face 412R. Therefore, flexible design of the refractive faces expands the possibility of the infrared ray detector 100 having various detection area.

FIG. 2 shows the outer cover 400 with the prism element 410 which is faced to the top plate 321 of the housing 300. Consequently, dust on the outer surface of the outer cover 400 is easily removed. Further, the outer cover becomes a good-looking cover.

The prism element 410 has the refractive surfaces 412L, 412R, and 412. Each of the refractive surfaces 412L, 412R, and 412 is formed into flat. The refractive surfaces 412L, 412R, and 412 are arranged in a row. However, instead thereof, it is also possible to employ the prism element having recesses with plane facets in a shape of an inverted truncated pyramid. In this case, the prism element is shaped to have the number of detection areas corresponding to the number of the facets of the recesses. Therefore, this configuration enables the infrared ray detector 100 to have more viewing fields than the infrared ray detector 100 with the prism element 410 with V-shaped grooves.

Followings are explanations of the infrared ray receiving unit 200. The infrared ray receiving unit 200 includes infrared ray detection elements 210P and infrared ray detection elements 210M. The infrared ray detection elements 210P and the infrared ray detection elements 210M are arranged in an alternate fashion. The infrared ray detection element is defined by, for example, a thermopile, a bolometer, a pyroelectric element, and so on.

The infrared ray receiving unit 200 includes two infrared ray detection elements 210P and two infrared ray detection elements 210M. Both infrared ray detection elements 210P and 210M are provided with a light receiving surface of square shape. The infrared ray detection elements 210P and 210M are arrayed in two rows and two columns. One infrared ray detection element 210P is disposed at a diagonal position with respect to the other infrared ray detection element 210P. Similarly, one infrared ray detection element 210M is disposed at a diagonal position with respect to the other infrared ray detection element 210M. The infrared ray detection element 210P and the infrared ray detection element 210M are arranged along a direction which is inclined at 45 degrees with respect to a direction along which the first refractive face 412L, exit face 412, and the second refractive face 412R are arranged. When the infrared ray detection elements 210P and the infrared ray detection elements 210M receive the infrared ray, each infrared ray detection elements 210P and each infrared ray detection elements 210M output electrical signal. The infrared ray detection elements 210P at an upper side and a lower side are configured to output the electrical signal having positive electrical polarity when the infrared ray detection element 210P receives the infrared ray. The infrared ray detection elements 210M at a left side and a right side are configured to output the electrical signal having negative electrical polarity when the infrared ray detection element 210M receives the infrared ray. Consequently, when the human moves in the detection areas 900L, 900C, and 900R, the infrared ray receiving unit 200 output the electrical signal with the positive electrical polarity and the electrical signal with the negative electrical polarity alternately.

Figure 4:
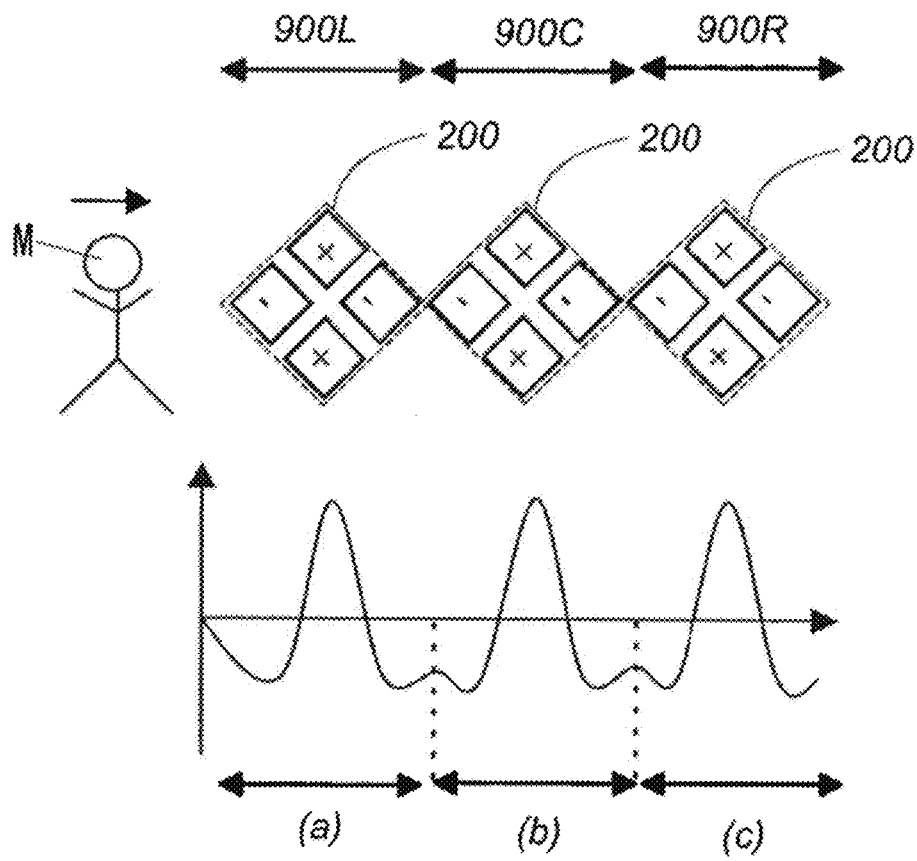
FIG. 4 is a graph showing an electrical signal which is output from the infrared ray receiving unit when the infrared ray receiving unit receives the infrared ray radiated from the human.

FIG. 4 shows a case where the human, the infrared ray source, pass through the detection area 900L, 900C, and 900R in order from the left to the right. When the human M passes through the detection area 900L, the infrared ray receiving unit 200 outputs the electrical signal (a) shown in FIG. 4. Subsequently, when the human M passes through the detection area 900C, the infrared ray receiving unit 200 outputs the electrical signal (b) shown in FIG. 4. Finally, when the human M passes through the detection area 900R, the infrared ray receiving unit 200 outputs the electrical signal (c) shown in FIG. 4. Consequently, the infrared ray detector 100 is capable of detecting the existence of the human M in wide detection area. Furthermore, when the human M moves in the detection areas, the infrared ray detection elements 210P and 210M vary signal output of the electrical signal according to the movement of the human M in the detection area. Therefore, the infrared ray receiving unit reliably detects the existence of the human in the detection area according to the movement of the human M in the detection area.

Figure 5:
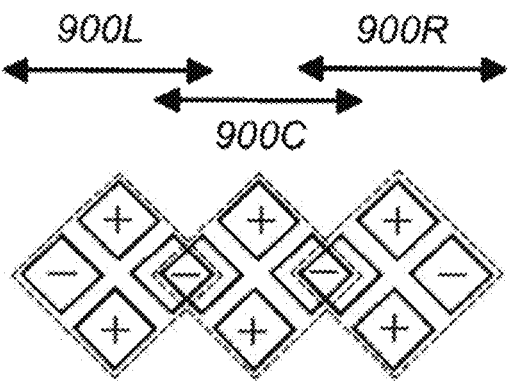
FIG. 5 is a schematic view showing the detection areas of the infrared ray receiving elements. One of the detection areas is partially overlapped with the other detection areas.

FIG. 5 also shows the infrared ray receiving unit 200. This infrared ray receiving unit 200 has the left and the right infrared ray receiving element 210M. The detection area 900L, 900C, and 900R respectively have overlapping portion with respect to the adjacent detection areas, whereby both left and right infrared ray receiving element 210M receive the infrared ray from the overlapping portion. This configuration makes it possible for the infrared ray detector 100 to narrow the area of keeping on outputting the electrical signal having the negative polarity from the infrared ray receiving unit 200.

In the above infrared ray detector 100, the prism element 410 converts the infrared ray incident thereon from the detection area to the infrared ray proceeding along the optical axis. The condenser lens 330 concentrates the infrared ray which travels along the optical axis of the condenser lens 330 and incident on the condenser lens 330 to the infrared ray receiving unit 200. The infrared ray receiving unit 200 detects the infrared ray, and then the infrared ray receiving unit 200 outputs the electrical signal. Consequently, the infrared ray detector 100 detects the existence or nonexistence of the human in the detection area.

Figure 6:
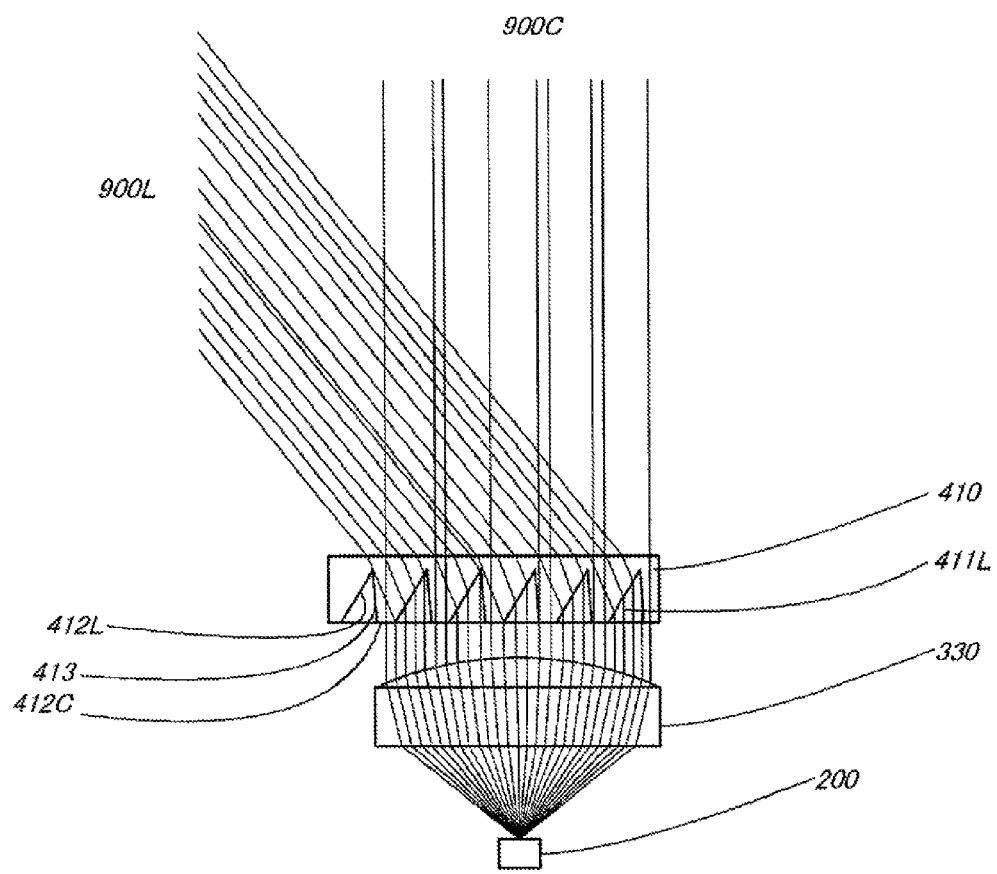
FIG. 6 is a schematic view showing the prism element, the condenser lens, and the infrared ray receiving unit of a first modification.

FIG. 6 shows a first modification of this embodiment. In this modification, each V-shaped groove 411 is composed of the first refractive face 412L and a connection surface 413. Consequently, the prism element 410 includes the refractive faces 412L, the exit faces 412C, and the connecting faces 413. The connection face 413 is formed to have its plane which is approximately parallel to the optical axis of the condenser lens 330. The connection face 413 prohibits the infrared ray incident thereon at a predetermined inclined angle with respect to the optical axis of the condenser lens 330 from proceeding along the optical axis. Therefore, the prism element 410 is configured to convert the infrared ray incident thereon from the detection area 900L and 900C to the infrared ray which proceeds along the optical axis of the condenser lens and travel to the condenser lens.

It is difficult to manufacture the prism element 410 having the connection face 413 which is parallel to the optical axis of the condenser lens 330 by metal molding of the synthetic resin. For this reason, the prism element 410 is formed to have the connection face 413 which is almost parallel to the optical axis of the condenser lens 330. In this case, it is preferred to form the connection face 413 with a light interceptor. The light interceptor is configured to reduce the infrared light transmissivity of the connection face 413. Consequently, the connection face 413 with the light interceptor has the infrared light transmissivity which is lower than that of the first refractive faces 412L and the exit faces 412C. As a result, the light interceptor prevents the infrared ray incident on the connection face 413 from proceeding to the condenser lens 330. Consequently, the light interceptor prevents the infrared ray receiving unit from producing improper operation. The light interceptor is formed at manufacturing process of the prism element 410 by roughing the metal mold previously. Furthermore, the light interceptor is also formed by following processes of molding the prism element by the metal mold and subsequently polishing the prism element. Moreover, the light interceptor is also provided to the connection face 413 by applying the acrylic resin on the connection face 413. The light interceptor is also provided to the connection face 413 by molding the acrylic resin on the connection face 413 integrally. This is because the acrylic resin has comparatively high infrared light absorption property. However, the forming process of the light interceptor is not limited to the above described processes.

Figure 7:
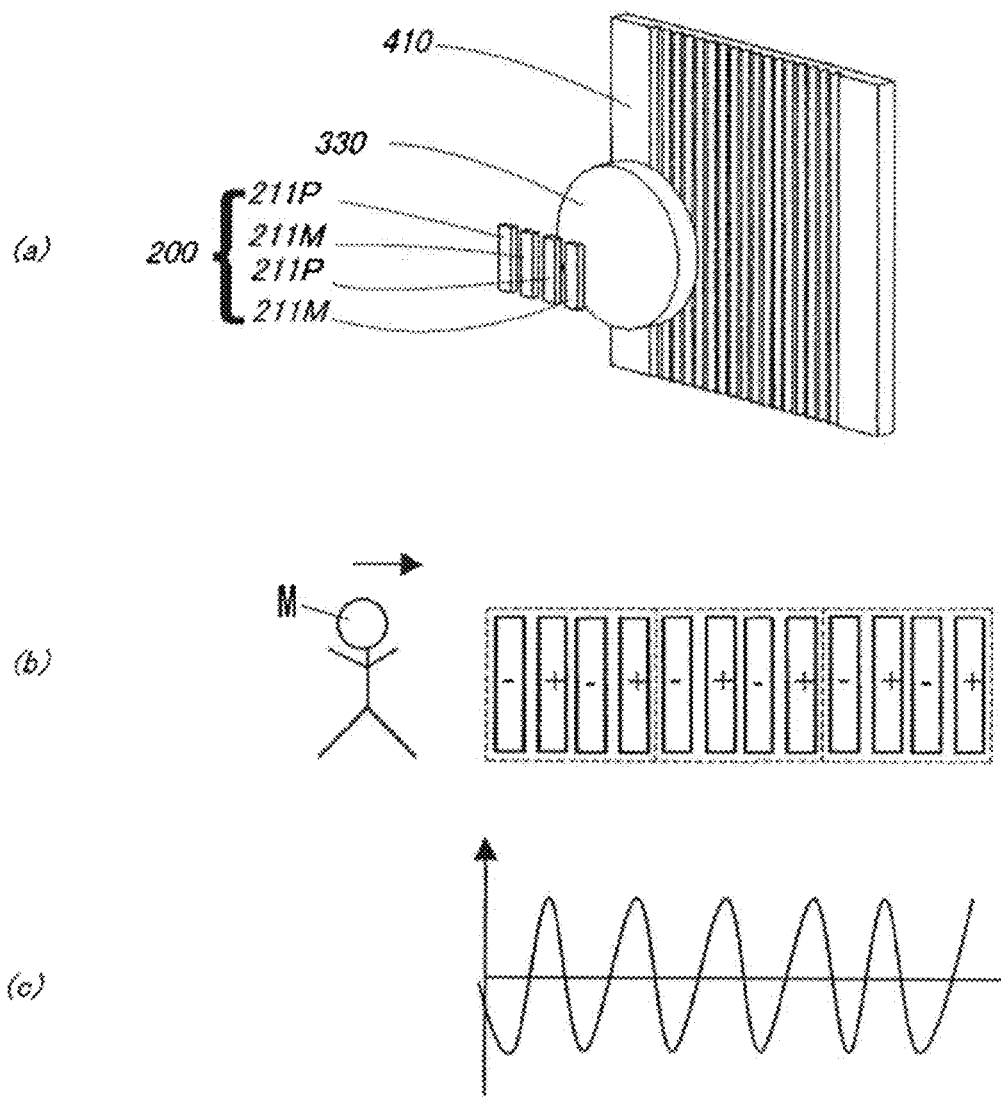
FIG. 7(a) is a perspective view of the prism element, the condenser lens, and the infrared ray receiving unit in a second modification.
FIG. 7(b) is a schematic view of the infrared ray receiving unit which detects the movement of the human moving in the detection area.
FIG. 7(c) is a graph showing the signal which is output from the infrared ray receiving unit when the human moves along the direction shown in FIG. 7(b).

FIG. 7 shows a second modification of the embodiment. As shown in FIG. 7(a), the infrared ray receiving unit 200 in this modification includes a plurality of infrared ray detection elements 211P and the infrared ray detection elements 211M. Each infrared ray detection elements 211P and 211M is formed to have a rectangular ray receiving surface. The infrared ray detection elements 211P and the infrared ray detection elements 211M are arranged along a direction parallel to a direction along which the first refractive faces 411L, the exit faces 411C, and the second refractive faces 411R are arranged. The first refractive faces 411L, the exit faces 411C, and the second refractive faces 411R are formed such that the detection areas 900L, 900C, and 900R lie next to the adjacent detection areas 900L, 900C, and 900R.

FIG. 7(c) is the signal output of the infrared ray detection element 211P and 211M in this modification. The human M passes across the detection area 900L, 900C, and 900R in order as shown in FIG. 7(b). According to the movement of the human, the infrared ray receiving unit 200 generates the electrical signal with small variations. In this case, the infrared ray receiving unit 200 includes the infrared ray detection elements 211P and 211M which are arranged along the direction similar to the direction along which the detection areas 900L, 900C, and 900R are arranged. Therefore, the infrared ray detector 100 is configured to detect the movement of the human over a wide area. Moreover, the infrared ray receiving unit includes the even number of the infrared ray detection elements 211P and 211M. Therefore, the infrared ray detection elements 211P which output the electrical signal of positive polarity and the infrared ray receiving elements 211M is arranged alternately.

Figure 8:
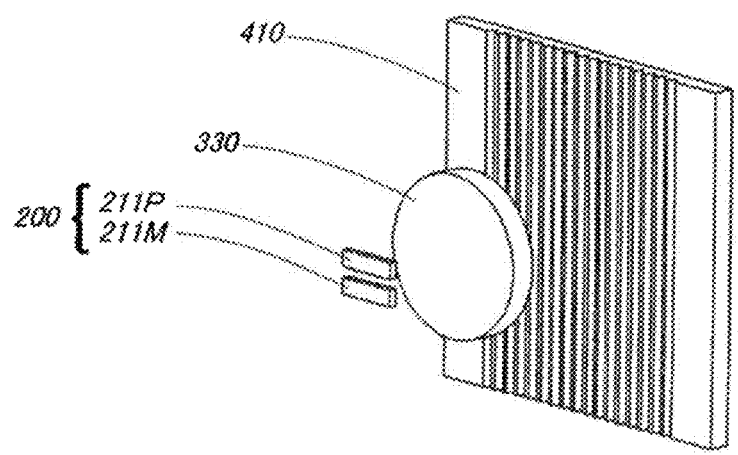
FIG. 8 is a perspective view of the prism element, the condenser lens, and the infrared ray receiving unit in a third modification.

FIG. 8 is a third modification of the embodiment. In this modification, the infrared ray receiving unit 200 includes the infrared ray detection element 211P and the infrared ray detection element 211M which have rectangular shape respectively. The infrared detection element 211P and the infrared ray detection element 211M are arranged along a direction perpendicular to a direction along which the first refractive face 411L, the exit face 411C, and the second refractive face 411R are arranged. In this case, the infrared ray receiving unit 200 is configured to detect the human M who passes a wide passage. The infrared ray receiving unit in this modification is suitable for security use.

Second Embodiment

Figure 9:
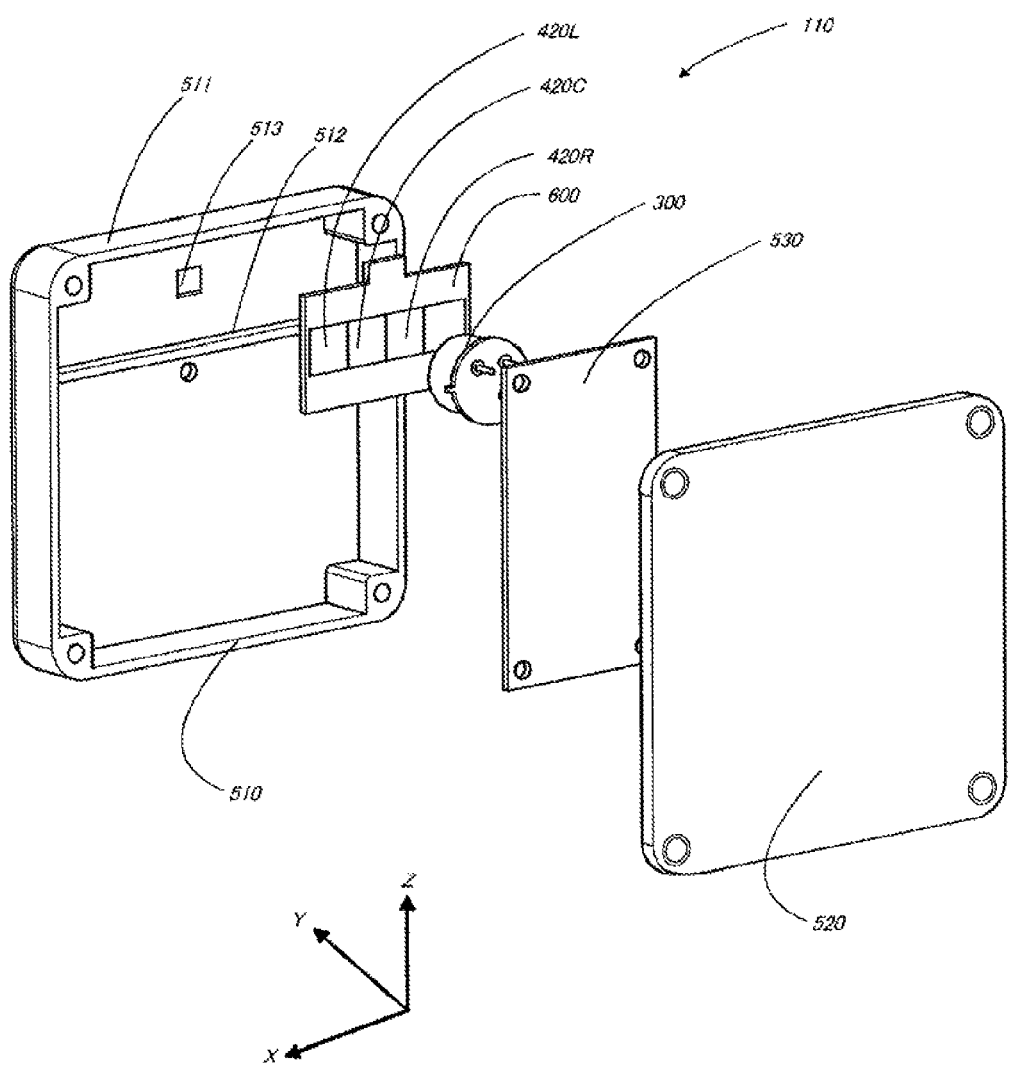
FIG. 9 is an exploded perspective view of the infrared ray detector in the second modification.
Figure 10:
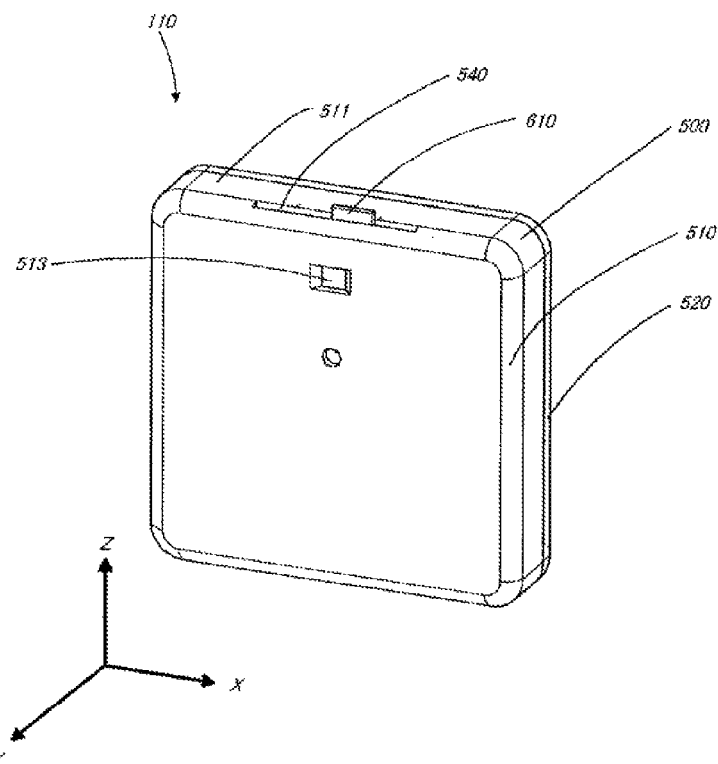
FIG. 10 is a perspective view of the infrared ray detector in the second modification.

The infrared ray detector 110 in this embodiment is explained with attached drawings. In the drawings, the components likes of the first embodiment are designated by the same reference numerals. Therefore, duplicate explanations of the same components are omitted. In FIG. 9 and FIG. 10, left side of the infrared ray detector 110 is defined by X direction. Front side of the infrared ray detector 110 is defined by Y direction. Upper side of the infrared ray detector 110 is defined by Z direction.

Figure 11:
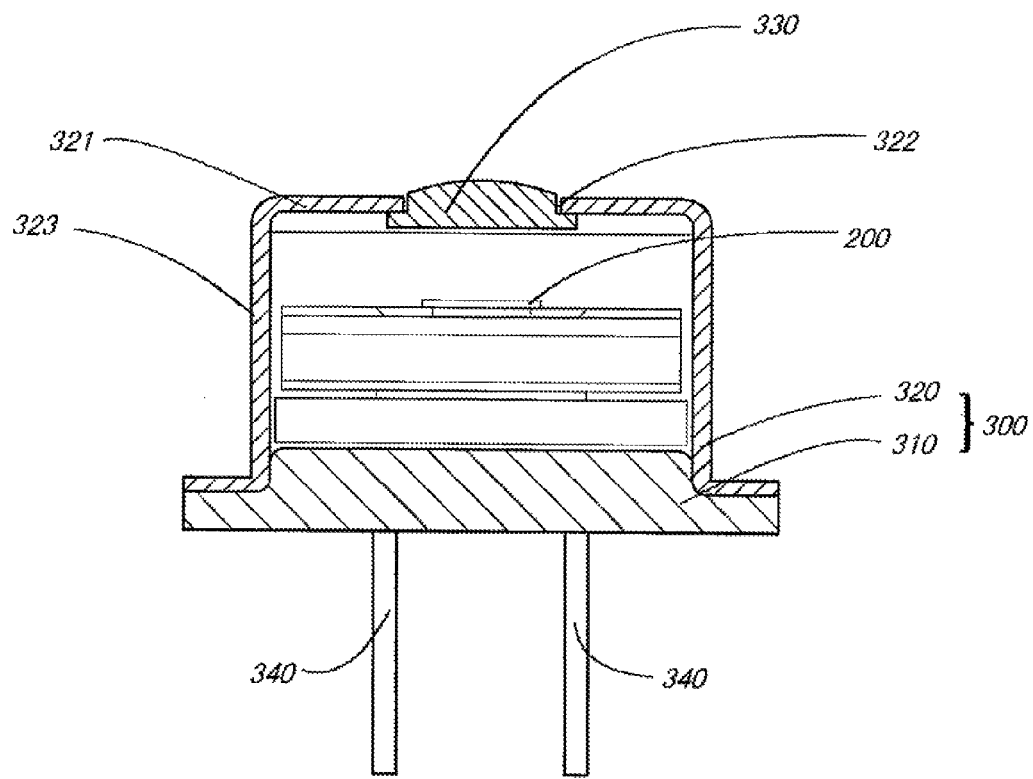
FIG. 11 is a side sectional view of the housing which incorporates the condenser lens and the infrared ray receiving unit.

FIG. 9 is an exploded perspective view of the infrared ray detector 110 in this embodiment seen from its rear side. The infrared ray detector 110 in this modification comprises the infrared ray receiving unit 200, the housing 300 with an aperture 322, the condenser lens 330, a plurality of the prism elements 420L, 4200, and 420R, a retainer sheet 600, the circuit board 530, and casing 500. It is noted that the housing 300, the infrared ray receiving unit 200, and the condenser lens 330 in this embodiment is same as the housing 300, the infrared ray receiving unit 200, and the condenser lens 330 in the first embodiment respectively. FIG. 11 is a side cross sectional view of the housing 300. The housing houses the infrared ray receiving unit 200 and the condenser lens 330.

The casing 500 is composed of a casing front half 510 and a casing rear half 520. The casing rear half 520 supports the circuit board 530. The circuit board 530 supports the housing 300 which incorporates the infrared ray receiving unit 200 and the condenser lens 330, and circuit components which is provided for sending the electrical signal generated by the infrared ray detection elements 210P and 210M to external devices. The casing front half 510 is installed with the casing rear half 520 so as to cover the casing rear half 520. FIG. 10 is a perspective view of the infrared ray detector 100 which houses the above components.

The casing front half 510 is formed with top plate 511 which is formed with a slit 540. The casing front half 510 is provided at its rear surface with a guide rail 512. The guide rail 512 is formed to project toward a rear direction. The guide rail 512 is cooperative with the top plate 511 to slidably receive the retainer sheet. Therefore, the guide rail 512 is cooperative with the top plate 511 to guide the retainer sheet 600. The casing front half 510 is provided with an aperture 513. The aperture 513 is located between the top plate 511 and the guide rail 512.

Figure 12:
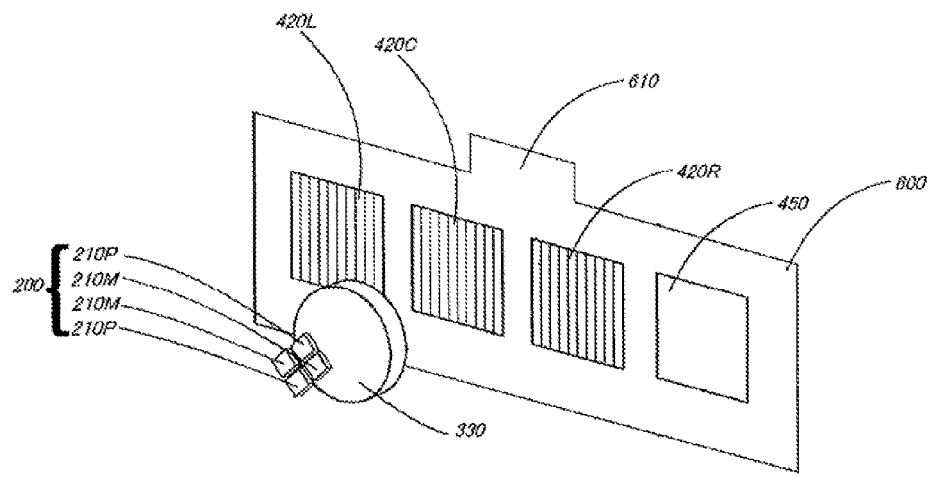
FIG. 12 is a schematic view showing the retainer sheet, the prism element, the condenser lens, and the infrared ray receiving unit.

FIG. 12 shows the infrared ray receiving unit 200, the condenser lens 330, and the retainer sheet which holds the prism elements. The retainer sheet 600 is made of the synthetic resin. The retainer sheet 600 is formed to have rectangular plate shape. The retainer sheet 600 has one width end with a lug 610. The retainer sheet is incorporated into the casing front half 510 such that the lug 610 is exposed to the outside through the slit 540, as shown in FIG. 10.

The lug 610 has width dimension along horizontal direction which is smaller than the width dimension of the slit 540 along the horizontal direction. The retainer sheet 600 has width dimension along the horizontal direction which is smaller than the width dimension along the horizontal direction of the casing front half 510. The retainer sheet 600 has height dimension along height direction which is almost equal to the length between a lower surface of top plate of the casing front half 510 and an upper surface of the guide rail 512. Therefore, when the lug 610 is moved from side to side, the retainer sheet 600 is moved from side to side along the guide rail 512.

The retainer sheet 600 holds the three kinds of prism elements 420L, 4200, and 420R. The prism elements 420L, 420C, and 420R are ranged along a lateral direction. Each prism elements 420L, 420C, and 420R have property of deflection of the incident light.

Figure 13:
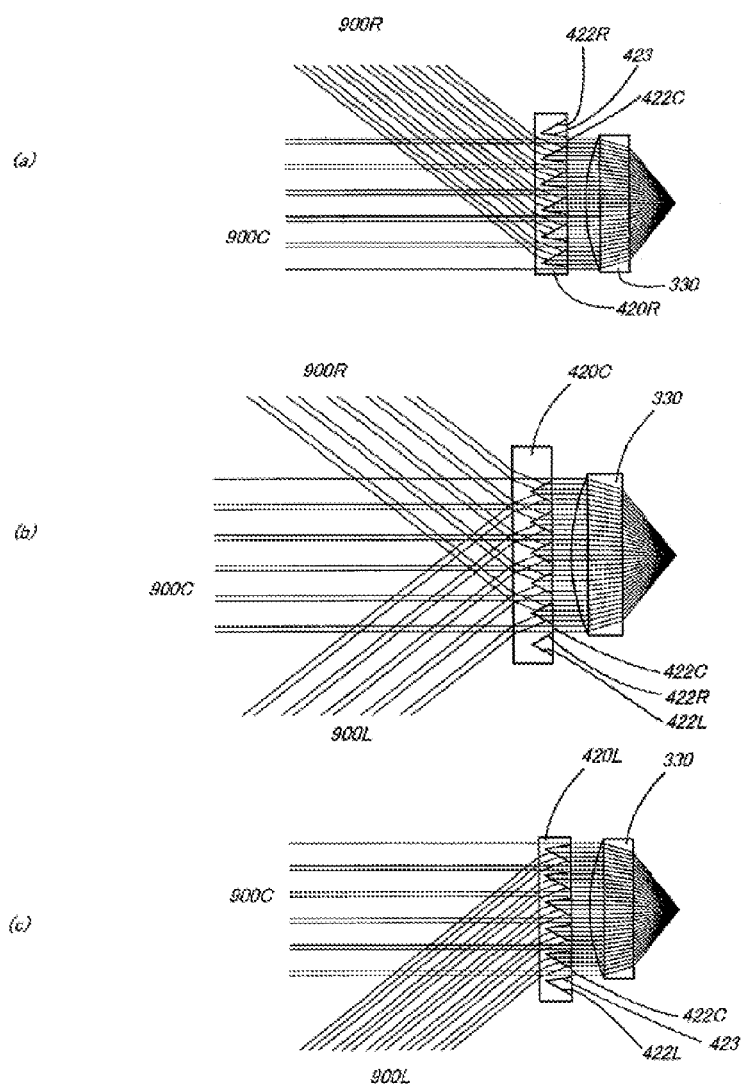
FIG. 13 is a schematic side sectional view showing the viewing field of each of the prism elements.

Each prism elements 420L, 420C, and 420R is formed to have square shape. FIG. 13 shows the side cross sectional view of the prism elements 420L, 420C, and 420R, and also shows the prism elements 420L, 420C, and 420R which deflect the infrared ray incident on the prism elements.

The prism element 420C in FIG. 13(b) includes the first refractive faces 422L, the second refractive faces 422R, and the exit faces 422C. Therefore, the prism element 420C converts the infrared ray incident thereon from the detection areas 900L, 900C, and 900R to the infrared ray which proceeds along the optical axis of the condenser lens. Therefore, the infrared ray converted by the prism element 420C proceeds toward the condenser lens 330. That is, the prism element 420C has viewing fields of the detection areas 900L, 9000, and 900R.

The prism element in FIG. 13(c) includes the first refractive faces 422L, the exit faces 422C, and the connection faces 423. Therefore, the prism element 422L converts the infrared ray incident thereon from the detection areas 900L and 900C to the infrared ray which proceeds along the optical axis of the condenser lens 330. Therefore, the infrared ray from the detection areas 900L and 900C converted by the prism element 420L proceeds toward the condenser lens 330. That is, the prism element 420L has viewing fields of the detection areas 900L and 900C.

The prism element 420R shown in FIG. 13(a) includes the second refractive faces 422R, the exit faces 422C, and the connection faces 423. Therefore, the prism element 422R converts the infrared ray incident thereon from the detection areas 900C and 900R to the infrared ray which proceeds along the optical axis of the condenser lens 330. Therefore, the infrared ray converted by the prism element 420R proceeds toward the condenser lens 330. That is, the prism element 420R has viewing fields of the detection areas 900C and 900R.

One of the prism element 420L, 420C, and 420R is overlapped with respect to the aperture 513 selectively according to the movement of the retainer sheet 600 by the lug 610. Therefore, one of the desired prism element 420L, 420C, and 420R is disposed in front of the condenser lens 330. The infrared ray detector 100 has the viewing fields which are varied by the prism element 420L, 420C, and 420R.

The prism elements 420L, 420C, and 420R and the retainer sheet 600 are integrally molded. Needless to say, it is also possible to mold the prism elements 420L, 420C, and 420R and the retainer sheet 600 separately, and subsequently to mount the prism elements 420L, 420C, and 420R on the retainer sheet 600. However, considering ease of manufacture, it is preferred to manufacture the prism elements 420L, 420C, and 420R and the retainer sheet 600 integrally. The prism elements 420L, 420C, and 420R are made of the polyethylene. This is because it is easy to mold the polyethylene. Furthermore, the cost of the polyethylene is low. However, the polyethylene has low infrared light transmissive property. Therefore, it is preferred to form the prism elements 420L, 420C, and 4208 having thickness of equal to or less than 0.5 millimeters. In this case, the prism elements 420L, 420C, and 420R are capable of having a transmissive property of over 50 percent. Moreover, it is preferred that a portion of the retainer sheet other than the prism elements 420L, 4200, and 4208 is shaped to have its thickness of several millimeters.

As mentioned above, the infrared ray detector 100 in this embodiment has the rectangular plate-like retainer sheet 600 with three kinds of plate-like prism elements. Therefore, there is no need for the infrared ray detector to employ a plurality of the condenser lenses. Furthermore, in the infrared ray detector of this embodiment, each prism elements are arranged adjacent to the condenser lens 330. Therefore, this configuration makes it possible to reduce the thickness of the casing. In addition, this configuration also makes it possible to employ a plurality of the prism elements 420L, 420C, and 420R. Furthermore, each prism elements 420L, 420C, and 420R has the viewing field which is different from the viewing fields of the other prism elements. Therefore, it is possible for the infrared ray detector 100 to have the viewing field in accordance with installation location of the infrared ray detector 100. Further, the retainer sheet 600 carries the prism elements 420L, 420C, and 420R. Therefore, the retainer sheet 600 and the prism elements 420L, 420C, and 420R are handled as single piece. Therefore, this configuration makes it possible for the infrared ray detector to reduce the number of the components that the infrared ray detector requires.

Moreover, as mentioned in this embodiment, the retainer sheet 600 may includes the lug 610 and structure of sliding. That is, the retainer sheet 600 may include a plurality of functions.

Figure 14:
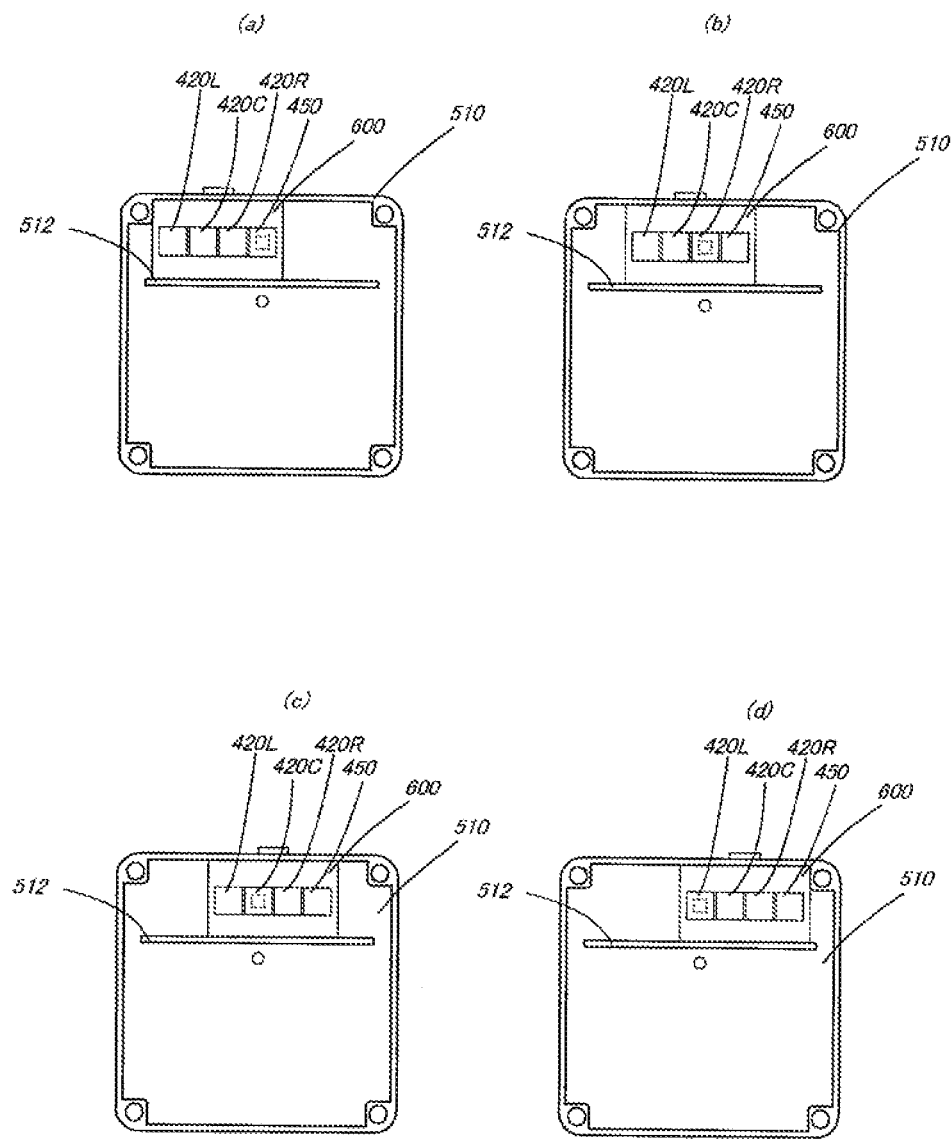
FIG. 14 is a front sectional view showing the movement of the retainer sheet of the above.

FIG. 14 shows relationships of the casing front half 510 and the retainer sheet 600. The retainer sheet 600 includes the prism elements 420L, 420C, and 420R and a flat plate 450. The flat plate 450 has no prism element. Therefore, with this configuration, one of the prism elements is overlapped with the aperture. Consequently, the prism element having a desired viewing field is overlapped with the aperture. In addition, the infrared ray detector 100 is constructed while the flat plate is overlapped with the aperture shown in FIG. 14(*a*). Consequently, there is no possibility of scratching the prism elements 420L, 420C, and 420R during construction.

The infrared ray detector 110 in this embodiment is installed on walls and so on. The infrared ray comes from the detection area of the viewing field of the prism element. The aperture 513 introduces the infrared ray into the casing 500. The prism element converts the infrared ray incident thereon to the infrared ray proceeding along the optical axis of the condenser lens 330. The condenser lens 330 concentrates the infrared ray proceeding along the optical axis into the infrared ray receiving unit 200. The infrared ray receiving unit 200 detects the infrared ray, and subsequently output the electrical signal. In this manner, the infrared ray detector 100 detects the existence and nonexistence of the human in the detection area determined by the viewing field of the prism element.

Figure 15:
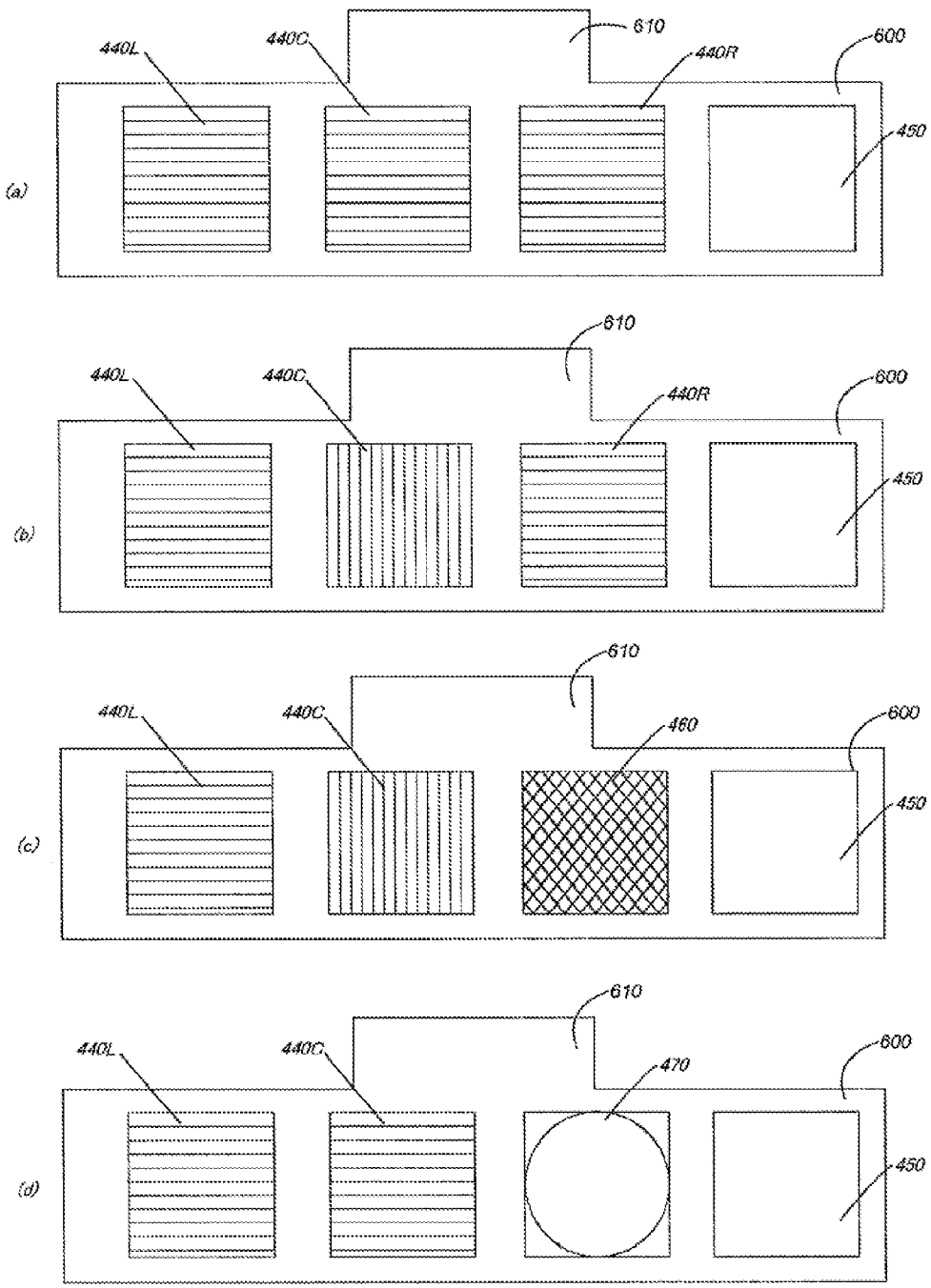
FIG. 15 is a front view of the retainer sheet in the modifications.

FIG. 15(*a*) is a first modification of the retainer sheet 600 incorporated into the infrared ray detector in this embodiment. In this modification, each of a prism element 440L, 440C, and 440R has V-shaped grooves extending along a lateral direction. The infrared ray detector in this modification is substantially equal to the infrared ray detector of the embodiment except for the prism element 440L, 440C, and 440R. With this configuration, the infrared ray detector 100 is capable of having a view field which lies over a front-back direction.

FIG. 15(*b*) is a second modification of the retainer sheet 600 incorporated into the infrared ray detector in this embodiment. The infrared ray detector 100 in this modification comprises a retainer sheet 600 which carries the prism element 440C, 440R, and 440L. The prism element 440C has the V-shaped grooves which extend along the vertical direction. Each prism elements 440L and 440R have the V-shaped grooves which extend along the lateral direction.

With this configuration, the infrared ray detector is capable of having a wide detection area over the lateral direction and a wide detection over the front direction selectively. Consequently, the infrared ray detector 100 in this modification is capable of having the detection area of high flexibility.

FIG. 15(*c*) is a third modification of the retainer sheet 600 incorporated into the infrared ray detector 100 in this embodiment. The infrared ray detector 100 in this modification comprises a neutral density filter 460 instead of the prism element 440R. The neutral density filter 460 has light transmission rate which is lower than light transmission rate of the prism element 440L and 440C.

In a case when the retainer sheet 600 is made of the polyethylene, the neutral density filter 460 is formed to have a thickness of 1 to 2 millimeters. In this case, the neutral density filter 460 has the light transmission rate of 5 to 20 percent. Therefore, the neutral density filter 460 decreases the sensitivity of the infrared ray detector 100. The infrared ray detector 100 with such a detection area described above is used as a switch which is operated when the infrared ray detector 100 detects the infrared ray irradiated from the hand.

In addition, it is possible to form the neutral density filter 460 by two-color molding with using such as acrylic resin having a low infrared light transmission rate. Furthermore, the neutral density filter 460 is also obtained by applying coating material having a low infrared light transmission rate. The retainer sheet 600 in this modification is capable of having a viewing field over the lateral direction, a viewing field over the front direction, and a viewing field at short distance selectively.

FIG. 15(*d*) shows the fourth modification of the retainer sheet 600 incorporated into the infrared ray detector 100 in this embodiment. The infrared ray detector 100 in this modification comprises a corrective lens 470 instead of the prism element 440R. The corrective lens 470 is configured to convert the infrared ray incident thereon from a distance into the infrared ray proceeding toward the condenser lens 330 without extending the detection area. That is, the infrared ray which proceeds along the optical axis of the condenser lens 470 enters the corrective lens 470. The condenser lens 330 concentrates the infrared ray into the light receiving surface of the infrared ray receiving unit 200. Therefore, the infrared ray detector 100 with this configuration is capable of having a high optical directivity.

In this case, the infrared ray detector having high response sensitivity with respect to the infrared ray from a long distance is obtained. Therefore, the infrared ray detector 100 in this modification may be capable of having a viewing field at long distance, the viewing field over the lateral direction and the viewing field over the front direction selectively.

It is noted that the retainer sheet 600 of the infrared ray detector 100 in the second embodiment comprises three kinds of the prism elements. However, the number of the prism elements is not limited thereto. Similarly, the kind of the prism elements is not limited thereto.

Although the present invention is described with particular reference to the above illustrated embodiments, the present invention should not be limited thereto. The present invention should be interpreted to encompass any combinations of the individual features of the embodiments.

The invention claimed is:

1. An infrared ray detector comprising
a prism element for passing infrared ray from a first side of the prism element to a second side of the prism element opposite to the first side;
a housing formed with an opening for introducing the infrared ray passed through said prism element;
a condenser lens configured to condense the infrared ray introduced into said housing through said opening;
an infrared ray receiver configured to receive the infrared ray condensed by said condenser lens, and to output electric signal according to the received infrared ray;
wherein
said prism element includes a plurality of V-shaped grooves and exit faces each formed between said V-shaped grooves,
V-shaped groove including refractive face, said refractive faces being shaped to convert the infrared ray incident on the refractive face at a predetermined inclined angle with respect to an optical axis of said prism element to the infrared ray proceeding along the optical axis,
each of said exit faces being shaped to take in the infrared ray coming along the optical axis and leave the same ray to exit out of the prism element along the optical axis,
said infrared ray receiver including at least two pair of first infrared ray detection elements and second infrared ray detection elements, said first infrared ray detection elements being configured to output said electric signal according to the received infrared ray, said second infrared ray detection elements being configured to output said electric signal according to the received infrared ray,
said electric signal which is output from said second infrared ray detection elements have electrical polarity which is opposite to electrical polarity of the electric signal which is output from said first infrared ray detection elements,
each of said two pair of first infrared ray detection elements and second infrared ray detection elements are arranged along a direction perpendicular to the optical axis,
both of said second infrared ray detection elements are arranged so that adjacent detection areas have overlapping portions that partially overlap each other, whereby both of said second infrared ray detection elements receive the infrared rays from the overlapping portions, and
wherein
said infrared ray detector further comprising an outer cover being made of material having a lower thermal conductivity than thermal conductivity of the housing,
said outer cover being installed to the housing so as to cover the housing,
said prism element is formed so as to be formed with said cover integrally,
said plurality of V-shaped grooves being formed along the same direction at said second side of said prism element, said plurality of exit faces being formed along the same direction at said second side of said prism element, and
wherein said outer cover is installed to the housing so as to completely cover the housing.

2. The infrared ray detector as set forth in claim 1, wherein said housing is housed in a casing which has an aperture for introducing the infrared ray to said prism element,
said infrared ray detector further comprising a retainer sheet which is configured to hold a plurality of said prism elements,
each of said prism elements has a viewing field which is different from that of the other prism elements, and
said retainer sheet being movably installed to said casing such that any one of said prism elements is selectively overlapped with said aperture.

3. The infrared ray detector as set forth in claim 2, wherein said retainer sheet is formed to have a rectangular shape,
said prism elements are arranged in a row along a lengthwise direction of said retainer sheet,
said casing being formed with a guide rail, and
said guide rail being configured to slidably receive a width of said retainer sheet.

4. The infrared ray detector as set forth in claim 3, wherein each of said prism elements has said V-shaped grooves all of which extends along a same direction.

5. The infrared ray detector as set forth in claim 3, wherein at least one of said prism elements has said V-shaped grooves which extend along a direction which is perpendicular to a direction of said V-shaped grooves of the other prism elements.

6. The infrared ray detector as set forth in claim 3, wherein said retainer sheet further holding a neutral density filter being configured to decrease an amount of the infrared ray passing through said neutral density filter, and
said neutral density filter and said prism elements are arranged in a row along said lengthwise direction.

7. The infrared ray detector as set forth in claim 3, wherein said retainer sheet further holding a corrective lens which converts the infrared ray incident on said corrective lens at a predetermined inclined angle with respect to the optical axis to the infrared ray proceeding along the optical axis, and
said corrective lens and said prism elements are arranged in a row along said lengthwise direction.

8. The infrared ray detector as set forth in claim 1, wherein said prism element is made of polyethylene.

9. An infrared target detector that creates alternating current in response to a moving target, comprising:
a prism element for directing infrared energy from locations away from the prism element and along an axis perpendicular to an optical axis of the prism element;
a housing with an optical opening for infrared energy passed through the prism element;
a condenser lens configured to condense the infrared energy introduced into the housing through the opening;
an infrared energy receiver configured to receive the infrared energy condensed by the condenser lens, and to output alternately, electric signals of opposite polarity in response to the moving target;
wherein
the prism element comprises parallel arranged V-shaped grooves,
each V-shaped groove includes a refractive face shaped to convert an infrared ray incident at a predetermined inclined angle with respect to the optical axis to a parallel direction to the optical axis;

each V-shaped groove has an exit face shaped to allow the infrared ray to exit along the optical axis, the infrared energy receiver including a plurality of infrared ray detection elements arranged in parallel along the same axis perpendicular to the optical axis and outputting alternating polarity signals;

wherein the alternating current is generated from the plurality of infrared ray detection elements in response to a target moving along the same axis perpendicular to the optical axis, wherein the prism element is shaped to have recesses with plane facets in a shape of an inverted truncated pyramid.

10. The infrared target detector of claim 9, wherein the prism element completely covers the housing.

11. The infrared target detector of claim 9, wherein the exit face of the prism element further comprises flat faces between each V-shaped groove, each of the groove faces is flat, and each of the groove faces and flat faces between them are several times the length of the infrared ray wavelength.

12. The infrared target detector of claim 9, further comprising a plurality of prism elements wherein each prism element has a viewing field that differs from the viewing field of the other prism elements.

13. The infrared target detector of claim 12, wherein the prism elements are slideably arranged on a retainer sheet within the infrared target detector.

14. The infrared target detector of claim 12, wherein the prism elements have V-shaped grooves all of which extend along the same direction.

15. A wide angle infrared target detector comprising:

an outer cover integrally formed with a prism element that is formed on the inside surface thereof;

the outer cover enclosing a condenser lens concentrically held inside and below the outer cover by a top plate;

an infrared receiving unit concentrically held below the top plate;

a cylindrical inner cover below the infrared receiving unit; and a flat shaped cylindrical metal base that is sealed with the outer cover, wherein the prism element directs infrared energy from locations away from the prism element and along an axis perpendicular to an optical axis of the prism element, and the infrared receiving unit comprises a plurality of receiving elements that are parallel arranged along the axis perpendicular to the optical axis.

16. The wide angle infrared target detector of claim 15, wherein the entire inside surface facing the infrared receiving unit comprises the parallel grooves.

17. The wide angle infrared target detector of claim 16, wherein the parallel grooves are individual V-shaped elements having flat first and second refractive faces, and additionally exit faces between the V-shaped refractive faces, wherein the exit faces are flat and parallel to the infrared target detector surface.

18. The wide angle infrared target detector of claim 17, wherein a connection face of the prism element is only approximately parallel to the optical axis of the condenser lens.

19. The infrared target detector of claim 9, further comprising an outer cover having a lower thermal conductivity than the thermal conductivity of the housing and wherein the outer cover covers the housing.

* * * * *